United States Patent
Zemanian et al.

(10) Patent No.: US 7,019,037 B2
(45) Date of Patent: Mar. 28, 2006

(54) MONOLAYER COATED AEROGELS AND METHOD OF MAKING

(75) Inventors: Thomas Samuel Zemanian, Richland, WA (US); Glen Fryxell, Kennwick, WA (US); Oleksiy A. Ustyugov, Spokane, WA (US)

(73) Assignee: Battelle Memorial Institute, Richland, WA (US)

( * ) Notice: Subject to any disclaimer, the term of this patent is extended or adjusted under 35 U.S.C. 154(b) by 178 days.

(21) Appl. No.: 10/045,948

(22) Filed: Oct. 26, 2001

(65) Prior Publication Data

US 2003/0092778 A1  May 15, 2003

(51) Int. Cl.
C01B 33/159 (2006.01)
C09K 3/00 (2006.01)
B01J 13/00 (2006.01)

(52) U.S. Cl. .................. 516/100; 516/101; 428/405; 427/219; 427/220

(58) Field of Classification Search ............ 516/100, 516/101; 428/405; 427/219, 220; 502/233, 502/244
See application file for complete search history.

(56) References Cited

U.S. PATENT DOCUMENTS

| | | | | |
|---|---|---|---|---|
| 3,562,177 A | * | 2/1971 | Teicher et al. .......... | 106/490 |
| 3,920,865 A | * | 11/1975 | Läufer et al. .......... | 427/220 |
| 5,565,142 A | * | 10/1996 | Deshpande et al. ..... | 427/220 X |
| 5,716,705 A | * | 2/1998 | Wirth et al. .......... | 428/405 X |
| 5,725,987 A | * | 3/1998 | Combes et al. ........ | 427/219 X |
| 5,948,314 A | * | 9/1999 | Geiss et al. ............ | 516/100 X |
| 6,005,012 A | | 12/1999 | Hrubesh et al. | |
| 6,239,243 B1 | * | 5/2001 | Deng et al. ............ | 428/405 X |
| 6,475,561 B1 | * | 11/2002 | Schwertfeger .......... | 516/100 X |
| 6,531,224 B1 | * | 3/2003 | Fryxell et al. .......... | 428/405 |

FOREIGN PATENT DOCUMENTS

| GB | 2100710 A | | 1/1983 |
|---|---|---|---|
| WO | WO 99/36355 | * | 7/1999 |
| WO | WO 00/56450 | | 9/2000 |

* cited by examiner

Primary Examiner—Daniel S. Metzmaier
(74) Attorney, Agent, or Firm—Douglas E. McKinley, Jr.

(57) ABSTRACT

Aerogels having a monolayer coating are described. The aerogel and a monolayer forming precursor are provided in a supercritical fluid, whereupon the aerogel and the monolayer forming precursor are reacted in said supercritical fluid to form a covalent bond between the aerogel and the monolayer forming precursor. Suitable aerogels are ceramic oxides such as silica, alumina, aluminosilicate, and combinations thereof. Suitable monolayer forming precursors include alkyl silanes, chlorosilanes, boranes, chloroboranes, germanes, and combinations thereof. The method may also include providing a surface preparation agent such as water, or hydroetching an aerogel to enhance the coating of the monolayer.

13 Claims, 1 Drawing Sheet

Figure 1: MPTMS (a) and EDAPTMS (b)

Figure 2: Experimental Apparatus

MONOLAYER COATED AEROGELS AND METHOD OF MAKING

STATEMENT REGARDING FEDERALLY SPONSORED RESEARCH OR DEVELOPMENT

This invention was made with Government support under Contract DE-AC0676RLO1830 awarded by the U.S. Department of Energy. The Government has certain rights in the invention.

CROSS-REFERENCE TO RELATED APPLICATIONS

Not Applicable

BACKGROUND OF THE INVENTION

Aerogels are low-density, high surface area solid materials, typically ceramic oxides, which have been expanded using an explosive release of pressure, typically in a supercritical fluid (SCF) or by flash evaporation of a solvent from a sol-gel precursor solution. One of the more common aerogels is composed of silicon dioxide (or "silica"), which is presently available from a variety of commercial vendors. Aerogels commonly display remarkably high surface areas, achieved at minimal cost due to the simplicity of the method used for their synthesis. For example, silica aerogels exhibiting surface areas of approximately 1,250 $m^2/g$, are commercially available. No time-consuming and expensive templating process is necessary for the manufacture of aerogels, as both the flash evaporation and SCF routes for their synthesis are readily amenable to large-scale production.

The high surface area exhibited by aerogels suggests their use in a variety of scientific and industrial applications. However, as a result of these limitations on the interfacial chemistry of the aerogel backbone, the utility of aerogels has been severely reduced, and aerogels have not found widespread use in applications where materials having a high surface area would present advantages.

For example, aerogels are typically very fragile structures, rendering them unsuitable in applications where a high surface area material is only useful if it is able to withstand an applied force, even as slight a force as the capillary force of a liquid. Also, in many applications, a material having both a high surface area and exhibiting specific chemical properties is desired. In many instances, the aerogels will fail to provide the specific chemical properties necessary for a given application. To overcome both of these drawbacks, many having skill in the art have attempted to provide coatings for aerogels. The ability to chemically modify the internal surfaces of an aerogel would provide direct access to inexpensive, high-surface area materials useful in a variety of uses, including, without limitation, as sorbents, catalysts and sensor materials. In this manner, it has been proposed that the aerogels could be made to exhibit enhanced strength and/or that aerogels could be made to exhibit chemical properties desired for a particular application by coating the internal and external surfaces of the aerogels with materials bonded on one end to the aerogel, and having a molecule with desired chemical or "functional" properties at the other end.

Unfortunately, attempts to provide coatings on aerogels have so far met with little success. Traditional synthetic coating methods utilizing liquid carriers and the like have been unable to effectively coat the broad expansive surface area of aerogels for a variety of reasons. The random structure of the aerogel has a significant number of constrictions and/or blockages that hinder mass transport into the complex pore structure. Further, due to the high temperature nature of the synthetic protocol typically used to make aerogels, there is very little adsorbed water within the aerogel. Thus, in silica aerogels for example, the surface silanol population is quite low. This severely limits the amount of silane that can be bound by this surface. Also, as noted above, the ceramic oxide wall structure of the aerogels is extremely thin. As a condensed liquid phase enters the pore structure, the capillary forces brought about by liquid column in the tiny pores can overcome the fragile strength of the aerogel wall, thereby crushing the internal structure of the aerogels simply by filling it with liquid.

Thus, there exists a need for aerogels coated with strength enhancing monolayers and functionalized monolayers, and methods for coating aerogels with strength enhancing monolayers and functionalized monolayers

BRIEF SUMMARY OF THE INVENTION

Accordingly it is an object of the present invention to provide aerogels having monolayer coatings and a method of making aerogels having monolayer coatings. As used herein, the term "monolayer coating" means that the surface areas or a portion of the surface area, of the aerogel has been coated with a material without collapsing the aerogel's high surface area structure. A monolayer is defined herein as an organized single layer of molecules, the formation of which is driven by the aggregation of the component monomers which have an affinity for both each other and the surface of the aerogel. As will be seen, this is not to imply that the structure of the aerogel is left completely unchanged by the process, but the high surface area and random structure that characterizes aerogels is generally left intact. The coating is formed when the monolayer coating is chemically bonded to the aerogel at the molecular level.

In the most basic aspect of the present invention, a monolayer coating is provided on the aerogel which improves the aerogel's physical properties, most notably its strength. In a more specialized aspect of the present invention in addition to coating the aerogel, the molecules that make up the monolayer coating also include chemical species, or "functional group" that exhibits a desired chemical property. Thus, the monolayer is composed of molecules having at one end a chemical species that is bonded to the aerogel, and a "functional group" that exhibits a desired chemical property at the other end. Accordingly, in this more specialized form of the present invention, the aerogel is bonded to a material displaying a functional group at the outer surface, and the aerogel is referred to as "functionalized."

Materials which have been formed into aerogels are generally limited to ceramic oxides. Silica, alumina, aluminosilicate, and combinations thereof are of particular commercial interest; however, as used herein the term "aerogel" should be understood to include any ceramic oxide which has been formed into a high surface area form by a process using a sudden release of pressure. Typically, but not meant to be limiting, the sudden release of pressure used in forming the aerogel is accomplished by the use of a supercritical fluid (SCF) or by flash evaporation of a solvent from a sol-gel precursor solution. Further, as used herein, the term "aerogels" should be understood to include "xerogels" as is used by those having skill in the art. While not formed with the same process utilizing a sudden release of pressure, xerogels nevertheless exhibit similar structure and may be usefully coated by the method of the present invention.

The present invention is enabled by the surprising discovery that aerogels may be coated with monolayers, without destroying the high surface area and random structure that characterizes aerogels, by utilizing a supercritical fluid as a reaction medium. Accordingly, the monolayer coated aerogels of the present invention are formed by first providing a monolayer forming precursor and an aerogel in a supercritical fluid, allowing the monolayer forming precursor to form a monolayer on the surface of the aerogel, and removing the thus formed monolayer coated aerogel from the supercritical fluid.

Supercritical fluids are defined herein as fluids at temperatures greater than their critical temperature, such that no liquid-gas phase separation exists at any pressure. Application of pressure allows compression of the fluid to liquid-like densities. As extraction media they have found widespread use; the most notable example is carbon dioxide, which is used for analytical sample preparation, recovery of natural products, decaffeination of coffee, and other separations. The chief advantages of fluids over liquid media are that their gas-like transport properties (viscosity, diffusivity) allow rapid and thorough penetration of small pores and orifices, while their liquid-like solvating power maintains their solute carrying capacity. Moreover, the lack of a liquid/gas phase separation prevents limitations on penetration due to surface tension or capillarity; wettability is irrelevant.

Monolayer forming precursors which may be used in the present invention are defined as any material soluble or metasoluble in the supercritical fluid that will form a covalent bond with the aerogel. As used herein "metasoluble" means materials which are only partially soluble, but which may be transported as emulsions or in the form of small droplets in the supercritical medium, or transported as a bulk liquid phase into the aerogel's interior by the supercritical medium. A further facet of metasolubility is the alteration of the solubility of the monolayer forming precursors as the reaction proceeds. For example, when coating aerogels by the method of the present invention, methoxysilanes may be used as the monolayer forming precursor. Methoxysilanes release methanol as a byproduct in the deposition reaction. Methanol is a powerful cosolvent for $CO_2$, and hence the solubility of the monolayer forming precursor is enhanced by the production of methanol during deposition. This increase in monolayer forming precursor solubility in turn enhances the deposition rate. While "autocatalytic processes" typically refers to the chemical catalysis of a reaction by a product of the reaction, as used herein, "autocatalytic processes" should be more broadly interpreted to include enhancements in reagent solubility as described above.

Monolayer forming precursors useful in the present invention are chemically self-limiting monomers (in order to ensure monolayer formation. Self limiting monolayer forming precursors include but are not limited to, alkyl silanes, chlorosilanes, boranes, chloroboranes, germanes, and combinations thereof. As used herein "self-limiting" means a chemical species with chemical functionality capable of forming a covalent bond with the substrate on one end of the molecule only. Thus, as a monomer molecule is deposited to the substrate that particular section of surface area is passivated against further monomer reaction. Moreover, the opposing end of the deposited molecule is not susceptible to further chemical reaction with the unreacted monomer, such that multilayers are precluded by the "self-limiting" nature of the monomer species.

Self assembled monolayers arise from deposition chemistry involving self-limiting monomers. While not meant to be limiting, examples of self assembled monolayers include systems based on the condensation of trimethoxysilanes and silica surfaces such as the monomers mercaptopropyl trimethoxysilane (MPTMS; shown in FIG. 1a) and ethylenediamine trimethoxysilane (EDAPTMS; FIG. 1b). With addition of water, the methoxy groups undergo hydrolysis, releasing methanol. The resulting hydroxysilanes then undergo condensation with the silica surface and crosslink with adjacent deposited silanes, forming a monolayer. Since the sulfur or ethylene diamine (EDA) headgroups do not react with either hydroxyls or methoxy groups further buildup of material is inhibited, and a monolayer is formed. Notably, the mercaptan headgroup in this example will selectively bind soft metals such as mercury, cadmium, silver, gold, and lead from aqueous media, whereas the EDA headgroup binds copper from aqueous solution and carbon dioxide from gaseous media. Thus, while not meant to be limiting, these examples are illustrative of two functionalized monolayer coated aerogels that are enabled by the present invention, and the use of such functionalized monolayer coated aerogels in applications such as sorbents for extraction of desired species from solutions. Notably, due to the tendency of the EDA group to react with $CO_2$ to form cyclic or bridged ureas, the deposition of these exemplary EDA terminated monolayers is preferably performed in supercritical $N_2$.

The forgoing examples are also illustrative of a separate embodiment of the present invention, whereby the aerogels are treated with surface preparation agents, such as water, to provide better adhesion of the monolayer forming precursors. Such treatment may either be carried out in advance, for example by hydroetching the aerogel in the manner described in co-pending U.S. patent application Ser. No. 10/045,930, and entitiled "HYDROETCHING OF HIGH SURFACE AREA CERAMICS USING MOIST SUPERCRITICAL FLUIDS", filed Oct. 26, 2001, now U.S. Pat. No. 6,812,259 the entire contents of which are incorporated herein by this reference, or such treatment may take place concurrently with the application of the monolayer forming precursors. For example, and not meant to be limiting, when depositing certain monolayer coatings on a silica aerogel, it is advantageous to generate hydroxyl groups on the surface of the silica to provide sites for the monolayer forming precursors to bond to the silica. This may be accomplished by adding water to the supercritical solution, along with the monolayer forming precursors, or by hydroetching the aerogel with water to generate hydroxyl groups prior to the introduction of the monolayer forming precursors.

The process of the present invention may also serve to modify the pore size distribution of the aerogel. Prior to processing, aerogel materials typically demonstrate a broad range of pore sizes and narrow bottlenecks, which impede the transport of material into and out of the internal void volume. BET analysis (Brunauer, Emmett, Teller) of aerogels produced by the method of the present invention has demonstrated that the process can narrow the pore size distribution (typically to approximately 200 Å+/−~50 Å) and removes the bottlenecks (typically to approximately 130 Å+/−~20 Å), thereby enhancing the transport of materials to and from the aerogel interior.

The narrow pore size distribution centered at approximately 200 Å+/−50 Å) enables several different uses of the monolayer coated aerogels, for example, and not meant to be limiting, as size selective sorbents or as reaction vessels. Since the pore size of the thus formed monolayer coated aerogels will accommodate most biomolecules (e.g. respiration or regulator) proteins. DNA, RNA, or viruses) yet will exclude larger structures such as blood cells, platelets, or spores, this pore size allows the application of the functionalized aerogels to detection of viral hazards, diagnosis of disease, filtration of sera, selective destruction of bioactive agents, or tethering of active proteins in a size selective environment. To illustrate the last application, and not meant to be limiting, the pore size of the functionalized aerogels enables the deposition of tethered trypsin within the interior of the aerogel using the method of the present invention, and then the removal or deactivation of the trypsin on the exterior surfaces by a liquid wash. An aerogel thus coated with a monolayer of trypsin can then be used as a bioreactor to selectively digest proteins. This strategy not only protects the trypsin molecules from digesting each other (thereby increasing the lifespan of the trypsin), but also prevents digestion of cellular material, which is too large to enter into the aerogel's pores, white allowing digestion of biomolecules such as the proteins listed above. Similarly, tethering radioactive alpha emitters Within the aerogel and removal of surface nuclides will create a size selective radiation chamber (alpha particles are insufficiently energetic to escape the silica structure, but any material entering the pore space will be exposed to the radiation.)

DETAILED DESCRIPTION OF THE INVENTION

Figure 1:
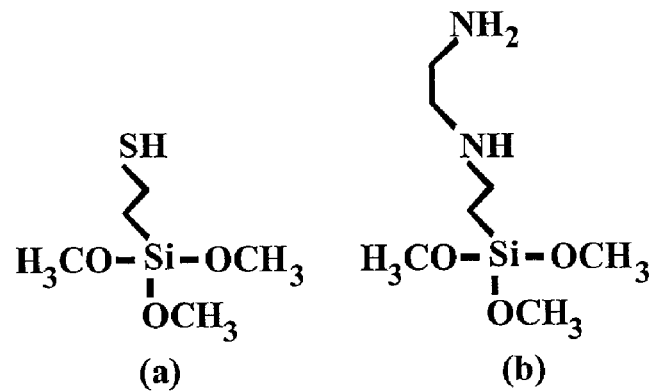
FIG. 1 is a schematic drawing of the chemical structure of two exemplarly monolayer forming precursors useful in the present invention; mercaptopropyl trimethoxysilane (MPTMS; shown in FIG. 1*a*) and ethylenediamine trimethoxysilane (EDAPTMS; shown in FIG. 1*b*).
Figure 2:
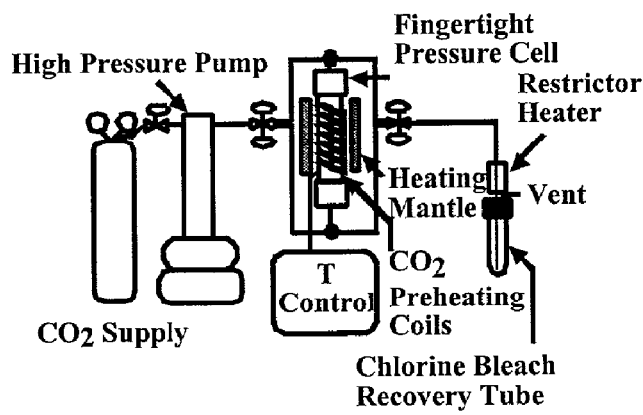
FIG. 2 is a schematic drawing of an apparatus used to demonstrate the method of the present invention and the materials formed thereby.

A series of experiments were undertaken to demonstrate the effectiveness of the present invention. In the first of these experiments, a 2 mm. granular solid silica aerogel was acquired from Armstrong. The pore structure of the aerogel as provided was complex, ranging from 200–600 Å. Gentle hydration caused rearrangement of the pore structure to a uniform pore size of approximately 200 Å. More aggressive hydration caused collapse of the aerogel structure, and immersion in liquid media crushed the internal structure of the aerogel due to capillary forces. EDAPTMS was obtained from United Chemical Technologies and used as provided. The supercritical $N_2$ fluid ($SCN_2$) used in the depositions were obtained from Scott Specialty gases and were 99.95% pure or better. The apparatus used for the supercritical fluid depositions is presented schematically in FIG. 2.

As an example, to perform a deposition approximately 1 g of the substrate material was added to the pressure cell. The aerogel was hydrated by adding 26% (w/w) $H_2O$ to the cell and pressurizing for 15 minutes with $N_2$ or $CO_2$ at 150° C. and 7,500 psi. 1–1.5 ml, of the MPTMS or 1.7 ml of EDAPTMS was then added to the cell, the cell was sealed, and pressurized with $N_2$ or $CO_2$ to 7,500 psi and held at 150° C. for the desired processing time.

Figure 3:
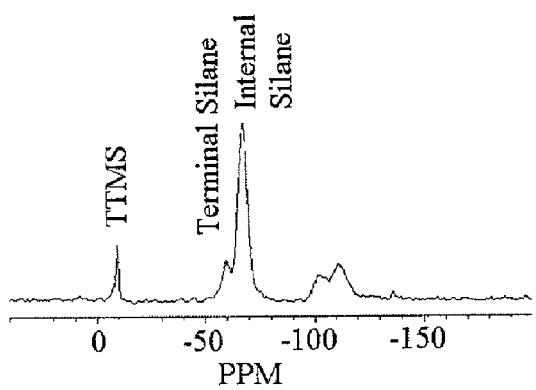
FIG. 3 is an NMR spectrum of a sample monolayer coated aerogel formed to demonstrate the method of the present invention and the materials formed thereby.

The results for deposition of siloxane monolayers to silica aerogel showed excellent coverage of the aerogel. The $^{29}Si$ NMR spectrum of this material is shown in FIG. 3. The experiment demonstrated an extremely high degree of crosslinkage, as is evident in the 90%/10% dominance of the −68 ppm. "internal" peak over the −58 ppm. "terminal" peak.

The preservation of the internal surface area is evident from the ability of the material to absorb Cu(II) from aqueous solution. This was demonstrated by the addition of a small amount of the EDAPTMS functionalized aerogel material to a 0.1M $CuSO4_{(aq)}$ solution, resulting in rapid decolorization of the solution, leaving the solution water-white in 10–15 minutes, and the functionalized aerogel material a deep blue color. Also notable is that the crosslinking of these monolayers strengthened the internal structure of the aerogel such that it could withstand immersion in liquids.

A further series of experiments were undertaken to demonstrate the various aspects of the present invention. Various monolayer forming precursors, supercritical fluids, and operating parameters were tested as indicated in Table 1 below. All of the monolayer coatings were deposited to silica aerogels.

TABLE 1

| Monomer | SCF | T [° C.] | P [bar] | Method | Coverage [molec/nm$^2$] | BET surface area [m$^2$/g] |
|---------|-----|----------|---------|--------|--------------------------|----------------------------|
| MPTMS | $CO_2$ | 150 | 517 | 26% prehydrated aerogel, 1.5 ml MPTMS/g moist aerogel, single deposition, SFE wash | unknown | 284 |
| MPTMS | $CO_2$ | 150 | 517 | same as above, smaller sample | 3.21 | 266 |
| EDAPTMS | $N_2$ | 100 | 517 | 26% prehyd. aerogel, 0.8 ml EDA/g moist aerogel, single deposition, no wash | 3.60 | 247 |
| EDAPTMS | $N_2$ | 100 | 517 | 26% prehyd. aerogel, 2.0 ml EDA/g moist aerogel, single deposition, no wash | 5.0 | 216 |
| EDAPTMS | $N_2$ | 150 | 517 | no prehyd, 0.245 ml $H_2O$ and 1.8 ml EDA/g dry aerogel at each stage, two stage deposition, no wash | 11 | 153 |

TABLE 1-continued

| Monomer | SCF | T [° C.] | P [bar] | Method | Coverage [molec/nm²] | BET surface area [m²/g] |
|---|---|---|---|---|---|---|
| prop-phos | $N_2$ | 150 | 517 | hydrotech, 1.6 ml prop-phos/g dry aerogel at each stage, two stage deposition, no wash | 4.6 | 31.4 |
| APS | $N_2$ | 100 | 517 | hydrotech, 1.9 ml APS/g dry aerogel, one stage deposition, no wash | 10.7 | 255 |
| CPCTS | $N_2$ | 70 | 517 | hydrotech in $Cl_2$, 1.4 ml CPCTS/g dry aerogel, one stage deposition, no wash | 5.3 | 56 |

Notes:
1. MPTMS: 3-mercaptopropyltrimethoxysilane, CAS registry 4420-74-0
2. EDAPTMS: 2-aminoethyl-3-aminopropyltrimethoxysilane, CAS registry 1760-24-3
3. APS: 3-aminopropyltrimethoxysilane, CAS registry 13822-56-5
4. prop-phos: (3-diethylphosphonato)-N-(3'-trimethoxysilylpropyl) propionamide
5. CPTCS: 3-chloropropyltrichlorosilane, CAS registry 2550-06-3

CLOSURE

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

We claim:

1. A composition of matter comprising an aerogel having pore sizes of between 150 Å and 250 Å and bottlenecks of between 110 Å and 150 Å said aerogel further having a monolayer coating, wherein a monolayer coating is an organized single layer of molecules, formed by the aggregation of component monomers which have an affinity for both each other and a surface of the aerogel.

2. The composition of matter of claim 1, wherein said aerogel is a ceramic oxide.

3. The composition of matter of claim 1, wherein said ceramic oxide is selected from the group consisting of silica, alumina, aluminosilicate, and combinations thereof.

4. The composition of matter of claim 1, wherein said monolayer coating is formed of self-limiting monomers.

5. The composition of matter of claim 1, wherein said self-limiting monomers are selected from the group consisting of alkyl silanes, chlorosilanes, boranes, chloroboranes, germanes, and combinations thereof.

6. A composition of matter comprising a ceramic oxide aerogel having pore sizes of between 150 Å and 250 Å and bottlenecks of between 110 Å and 150 Å said ceramic oxide aerogel further having a monolayer coating consisting essentially of a self-limiting monomer, wherein a monolayer coating is an organized single layer of molecules, formed by the aggregation of component monomers which have an affinity for both each other and a surface of the aerogel.

7. The composition of matter of claim 6, wherein said ceramic oxide is selected from the group consisting of silica, alumina, aluminosilicate, and combinations thereof.

8. The composition of matter of claim 6, wherein said self-limiting monomer is selected from the group consisting of alkyl silanes, chlorosilanes, boranes, chloroboranes, germanes, and combinations thereof.

9. A method for forming an aerogel having a monolayer coating comprising the steps of:
   a. hydroetching an aerogel to provide a hydroetched aerogel,
   b. providing said hydroetched aerogel with a monolayer forming precursor in a supercritical fluid,
   c. reacting said hydroetched aerogel and said monolayer forming precursor in said supercritical fluid to form a covalent bond between said hydroetched aerogel and said monolayer forming precursor.

10. The method of claim 9, wherein said aerogel is provided as a ceramic oxide.

11. The method of claim 9, wherein said ceramic oxide is provided as selected from the group consisting of silica, alumina, aluminosilicate, and combinations thereof.

12. The method of claim 9, wherein said monolayer forming precursor is provided as self-limiting monomers.

13. The method of claim 12, wherein said self-limiting monomers are provided as selected from the group consisting of alkyl silanes, chlorosilanes, boranes, chloroboranes, germanes, and combinations thereof.

* * * * *